(12) United States Patent
Sugita et al.

(10) Patent No.: US 6,230,743 B1
(45) Date of Patent: May 15, 2001

(54) CHANNEL-SWITCHING VALVE AND METHOD OF CONTROLLING THE SAME, AND REFRIGERATING CYCLE AND METHOD OF CONTROLLING THE SAME

(75) Inventors: Mitsuo Sugita; Noboru Nakagawa; Tadashi Aoki; Toshihiro Teranishi, all of Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 09/542,455

(22) Filed: Apr. 4, 2000

Related U.S. Application Data

(62) Division of application No. 09/230,886, filed as application No. PCT/JP97/02726 on Aug. 6, 1997, now Pat. No. 6,164, 331.

(30) Foreign Application Priority Data

Aug. 6, 1996 (JP) .................................................. 8-207241

(51) Int. Cl.[7] .................................................. F16K 11/02
(52) U.S. Cl. ........................................................ 137/625.43
(58) Field of Search .......................................... 137/625.43

(56) References Cited

U.S. PATENT DOCUMENTS 5,507,315 * 4/1996 Parker ............................. 137/625.43

FOREIGN PATENT DOCUMENTS

| 5-19063 | 3/1993 | (JP) . |
| 7-16084 | 3/1995 | (JP) . |
| 8-42737 | 2/1996 | (JP) . |
| 8-193667 | 7/1996 | (JP) . |
| 8-247328 | 9/1996 | (JP) . |

* cited by examiner

Primary Examiner—John Fox
(74) Attorney, Agent, or Firm—McDermott, Will & Emery

(57) ABSTRACT

A channel-switching valve is provided. The channel-switching valve comprises: a cylindrical valve housing whose one end is closed by a main valve seat; a low pressure outlet and two connecting holes for connecting the inside and the outside of the valve housing; a high pressure inlet for connecting the inside and the outside of the valve housing; and a connecting groove and a guide groove formed on an end surface of a main vale element which is accommodated in the valve housing. When the main valve element is situated in a first rotation position, one of the connecting holes is connected to the low pressure outlet by the connecting groove while the other one of the connecting holes is connected to the high pressure inlet. When the main valve element is situated in a second rotation position, the other one of the connecting holes is connected to the low pressure outlet by the connecting groove while the one of the connecting holes is connected to the high pressure inlet by the guide groove.

3 Claims, 10 Drawing Sheets

45A : AIR-CONDITIONING SWITCH POWER CIRCUIT

45B : AIR-CONDITIONING SWITCH POWER CIRCUIT

45C : AIR-CONDITIONING SWITCH POWER CIRCUIT

CHANNEL-SWITCHING VALVE AND METHOD OF CONTROLLING THE SAME, AND REFRIGERATING CYCLE AND METHOD OF CONTROLLING THE SAME

This application is a Divisional of application Ser. No. 09/230,886 filed Feb. 2, 1999, now U.S. Pat. No. 6,164,331, which is a 371 of International application Ser. No. PCT/JP97/02726, filed Aug. 6, 1997.

BACKGROUND OF THE INVENTION

1. Field of the Invention

The present invention relates to a channel-switching valve used for switching refrigerant channels depending on the operation mode in a heat-pump type air conditioner, a method of controlling such a channel-switching valve, a refrigerating cycle whose refrigerant channels are switched depending on the operation mode in a heat-pump type air conditioner, and a method of controlling such a refrigerating cycle.

2. Related Art

In the air conditioner, refrigerant channels in the refrigerant cycle are switched by a channel-switching valve when the operation mode is switched.

A typical channel-switching valve is a four-way valve, and conventional types of four-way valve include a sliding type and a rotary type.

A sliding four-way valve comprises a cylinder having a high pressure port to which a high pressure channel communicating with the outlet of the compressor is connected, a low pressure port to which a low pressure port communicating with the inlet of the compressor is connected, and two switching ports to which a switching channel communicating with an indoor heat exchanger and a switching channel communicating with an outdoor heat exchanger are connected, and a piston disposed inside the cylinder.

The piston includes a valve element which forms two connecting spaces isolated from each other inside the cylinder.

With such a sliding four-way valve, the two connecting spaces are displaced as the piston reciprocates between a first position and a second position inside the cylinder.

When the piston is in the first position, one of the two switching ports is connected to the high pressure port via one of the two connecting spaces formed by the valve element inside the cylinder, and the other one of the two switching ports is connected to the low pressure port via the other one of the two connecting spaces, thereby switching the operation mode to one of a cooling mode and a heating mode.

Meanwhile, when the piston is in the second position, the one of the switching port is connected to the low pressure port via the one of the connecting space inside the cylinder, while the other one of the switching ports is connected to the high pressure port via the other one of the connecting spaces inside the cylinder, thereby switching the operation mode to the other one of the cooling mode and the heating mode.

Whether the piston is either in the first position or in the second position in the sliding four-way valve, two pressure adjusting spaces are formed on both sides of the piston in its moving direction inside the cylinder. Each of the pressure adjusting spaces is connected to one of the two connecting spaces via a narrow equalizer channel.

One of the two pressure adjusting spaces is selectively connected to the low pressure channel via a pilot path by an open pilot valve, without going through the cylinder.

In the sliding four-way valve, the pressures in the two pressure adjusting spaces are reversed by changing the state of the pilot valve, so that the piston can be moved from the first position to the second position, or from the second position to the first position.

At this point, one of the connecting spaces is connected to the outlet of the compressor via the high pressure port and the high pressure channel, and resultantly filled with the high pressure fluid.

The other one of the connecting spaces is connected to the inlet of the compressor via the low pressure port and the low pressure channel, and thus filled with the low pressure fluid.

In order to defrost the outdoor heat exchanger in the heating mode, the four-way valve is switched so as to switch the operation mode of the refrigerating cycle from the heating mode to the defrosting mode. When switching the refrigerating cycle from the defrosting mode to the heating mode after the defrosting operation, the four-way valve is switched, because the defrosting operation is substantially the same as the cooling operation.

With the conventional sliding four-way valve described above, however, there is a problem that the power consumption is high due to energizing the coil of a solenoid which is conducted to hold a current state of the pilot valve either in the cooling (or defrosting) mode or in the heating mode in the refrigerating cycle.

When an operation mode in which the coil of the solenoid need to be continuously energized is stopped in the sliding four-way valve described above, the pilot valve is opened or closed due to the stop of the energization to the coil of the solenoid, and the four-way valve is switched even though unnecessary.

As a result, the connections of the indoor heat exchanger and the outdoor heat exchanger are switched between the high pressure channel and the low pressure channel, respectively, which causes a big noise.

As for the conventional rotary four-way valve, a typical one is disclosed in Japanese Utility Model Application Laid-Open No. 7-16084. Such a rotary four-way valve comprises a cylindrical housing accommodating a cylindrical rotor provided with plastic magnets and a valve element, a disk-like valve seat closing one end of the housing and facing the valve element, and an electromagnet at the other end of the housing.

The rotary four-way valve has a high pressure port, a low pressure port, and two switching ports on the valve seat in the circumferential direction of the housing. A high pressure channel communicating with the outlet of the compressor is connected to the high pressure port; a low pressure channel communicating with the inlet of the compressor is connected to the low pressure port; a switching channel communicating with the indoor heat exchanger is connected to one of the two switching ports; and a switching channel communicating with the outdoor heat exchanger is connected to the other one of the two switching ports.

The rotary four-way valve also has two arcuate connecting grooves formed on the end surface of the valve element facing to the valve seat. The edge of the high pressure channel communicating with the high pressure port protrudes from one of the connecting grooves, and one end of a pin penetrating the center of the valve element is disposed in the center of the valve seat.

The rotary four-way valve has plastic magnet positions magnetized so that the north pole and the south pole are alternatively situated in the circumferential direction of the housing. Two metal members facing to each other are disposed on the outer surface of the housing, and the metal members are connected to the iron core of the electromagnet.

In the rotary four-way valve of this structure, the coil of the electromagnet is energized to cause magnetic flux passing through the fixed iron core of the electromagnet and the two metal members on the outer surface of the housing. The magnetic flux corresponding to the energizing direction of the coil acts on the plastic magnets, so that the rotor rotates around the pin inside the housing between a first position in which one end of one of the connecting grooves in the circumferential direction of the housing is in contact with the edge of the high pressure channel and a second position in which the other end of the one of the connecting grooves is in contact with the edge of the high pressure channel.

When the rotor is in the first position, the high pressure port is connected to one of the switching ports via one of the connecting grooves, and the low pressure port is connected to the other one of the switching port via the other one of the connecting grooves. When the rotor is in the second position, the high pressure port is connected to the other one of the switching ports via the one of the connecting grooves, and the low pressure port is connected to the one of the switching ports via the other one of the connecting grooves.

The high pressure port communicates with the space formed between the electromagnet and the rotor inside the housing via a connecting path maintained inside the housing, so that the end surface of the rotor on the electromagnet side is subjected to a pressure equal to that of the fluid introduced into the space of the housing from the outlet of the compressor via the high pressure channel, the high pressure port, and the connecting path.

Meanwhile, the end surface of the rotor on the valve seat side is subjected to a pressure equal to that of the fluid introduced into the inlet of the compressor via the low pressure port and the low pressure channel, because the valve seat is provided with the low pressure port communicating with the inlet of the compressor via the low pressure channel.

When the compressor is in operation, the pressure acting on the end surface of the rotor on the electromagnet side becomes greater than the pressure acting on the end surface of the rotor on the side of the valve seat, and due to the pressure difference, the rotor is energized toward the valve seat.

As a result, the lower end surface of the valve element is brought into contact with and sealed to the valve seat, and the rotation position of the rotor is secured while the coil of the electromagnet is not energized.

Like the sliding four-way valve, the rotary four-way valve switches the operation mode of the refrigerating cycle between the heating mode and the defrosting mode in the same manner as in switching the operation mode between the heating mode and the cooling mode.

However, when the pressure difference becomes very large between the end surface of the rotor on the electromagnet side and the end surface of the rotor on the valve seat side, the rotor cannot rotate even if the coil of the electromagnet is energized, because the static friction caused between the lower end surface of the valve element and the valve seat due to the pushing force acting on the rotor becomes greater than the rotating force of the rotor generated by the magnetic flux acting on the plastic magnets due to the energization of the coil of the electromagnet. As a result, the rotary four-way valve becomes liable to fail to switch between the cooling (or defrosting) mode and the heating mode in the refrigerating cycle.

The switching of the rotary four-way valve is generally performed when the difference in refrigerant pressure between the outlet side and the inlet side becomes low due to a refrigerant leak from the outlet side to the inlet side inside the compressor after a certain period of time of stopping the compressor.

When switching the operation mode in the refrigerating cycle, the compressor is temporarily stopped for a certain period of time, and the switching is performed when the difference in refrigerant pressure between the outlet side and the inlet side becomes low due to a refrigerant leak from the outlet side to the inlet side inside the compressor, so that the pressure difference can be small between the both ends of the rotor, and that the static friction between the lower end surface of the valve element and the valve seat can be smaller than the rotary force of the rotor.

As a result, switching the operation mode in the refrigerating cycle is time-consuming due to the temporary stop of the compressor, and a large amount of power is required for restarting the compressor and keeping it in operation until the difference between the inlet refrigerant pressure and the outlet refrigerant pressure becomes equal to the pressure difference in the normal operation. This presents a big problem especially when switching from the heating mode to the defrosting mode for the outdoor heat exchanger.

SUMMARY OF THE INVENTION

A first object of the present invention is to provide a channel-switching valve and a refrigerating cycle which can switch refrigerant channels to switch the operation mode of a heat-pump type air conditioner efficiently in terms of energy consumption and time required. The channel-switching valve and the refrigerating cycle can also prevent noise when stopping the operation.

A second object of the present invention is to provide a channel-switching valve control method and a refrigerant cycle control method which can improve operation efficiency by effectively switching refrigerant channels when switching the operation mode.

A third object of the present invention is to provide a channel-switching valve control method and a refrigerant cycle control method which can prevent noise when the operation is stopped.

To achieve the first object, the channel-switching valve according to claim 1 of the present invention comprises: a cylindrical valve housing with at least one end being open; a main valve seat which closes one end of the valve housing; a low pressure outlet and two connecting holes formed in the main valve seat so that the inside and the outside of the valve housing can be connected; a high pressure inlet for connecting the inside and the outside of the valve housing; a main valve element which is movable in an axial direction of the valve housing and rotatable in a circumferential direction of the valve housing, the main valve element being accommodated in the valve housing; a connecting groove for connecting the low pressure outlet to one of the two connecting holes when the main valve element is in a first rotation position, and for connecting the low pressure outlet to the other one of the two connecting holes when the main valve element is in a second rotation position, the connecting groove being formed on an end surface of the main valve element in the axial direction, and the end surface being in contact with the main valve seat; a guide groove for connecting the high pressure inlet to the other one of the two connecting holes when the main valve element is in the first rotation position, and for connecting the high pressure inlet to the one of the two connecting holes when the main valve element is in the second rotation position, the guide groove being formed on the end surface of the main valve element, and the end surface being in contact with the main valve seat; a pilot port for connecting the other end surface of the main valve element in the axial direction to the connecting groove, the pilot port penetrating through the main valve element; an equalizer channel for connecting the end surface of the main valve element to the other end surface of the main valve element via the outside of the main valve element at a flow rate lower than in the pilot port, the equalizer channel being formed inside the valve housing; a pilot valve element for opening and closing the pilot port by moving in the axial direction, the pilot valve element being accommodated inside the valve housing; main valve element drive means for rotating the main valve element in the circumferential direction; and pilot valve element drive means for moving the pilot valve element in the axial direction.

Also, to achieve the first object, the refrigerating cycle of claim 13 is made up of a compressor, an indoor heat exchanger, an outdoor heat exchanger, and a channel-switching valve. The channel-switching valve comprises: a high pressure inlet for introducing a high pressure fluid into the channel-switching valve from the compressor; a low pressure outlet for discharging a low pressure fluid from said channel-switching valve to said compressor; a first connecting hole for allowing fluid passage between the inside of the channel-switching valve and the indoor heat exchanger; and a second connecting hole for allowing fluid passage between the inside of the channel-switching valve and the outdoor heat exchanger. The high pressure inlet is connected to one of the first connecting hole and the second connecting hole, while the low pressure outlet is connected to the other one of the first connecting hole and the second connecting hole inside the channel-switching valve by the channel-switching valve. The one of the first connecting hole and the second connecting hole is connected to one of the indoor heat exchanger and the outdoor heat exchanger, while the other one of the first connecting hole and the second connecting hole is connected to the other one of the indoor heat exchanger and the outdoor heat exchanger. The channel-switching valve switches the connection of the first connecting hole between the indoor heat exchanger and the outdoor heat exchanger as well as the connection of the second connecting hole between the indoor heat exchanger and the outdoor heat exchanger. This refrigerating cycle is characterized by an equalizer unit which forcibly equalizes the pressure of a refrigerant passing through the first connecting hole and the pressure of a refrigerant passing through the second connecting hole inside the channel-switching valve prior to the connection switching by the channel-switching valve.

To achieve the second object, the control method of claim 10 controls a channel-switching valve which switches fluid channels of a high pressure fluid and a low pressure fluid introduced into a hallow valve housing from the outside by moving a main valve element between a first position and a second position. This method is characterized by comprising the step of connecting the low pressure fluid channel inside the valve housing by moving the main valve element to a third position in accordance with an external instruction. The third position is difference from both first and second positions.

To achieve the third object, the control method of claim 12 further comprises the step of holding the main valve element either in the first position or in the second position by virtue of the difference in pressure between the high pressure fluid and the low pressure fluid, when the high pressure fluid channel and the low pressure fluid channel is unconnected inside the valve housing.

Also, to achieve the second object, the control method of claim 16 controls a refrigerating cycle in which: a high pressure fluid channel for introducing a high pressure fluid from a compressor is connected to one of an indoor heat exchanger and an outdoor heat exchanger; a low pressure fluid channel for introducing a low pressure fluid into the compressor is connected to the other one of the indoor heat exchanger and the outdoor heat exchanger; the high pressure fluid channel, the low pressure fluid channel, the indoor heat exchanger, and the outdoor heat exchanger are connected to a channel-switching valve; and the channel-switching valve switches channels between the high pressure fluid channel, the low pressure fluid channel, the indoor heat exchanger, and the outdoor heat exchanger. This control method is characterized by comprising the step of connecting high pressure fluid channel and the low pressure fluid channel inside the channel-switching valve by controlling the channel-switching valve in accordance with an external instruction.

To achieve the third object, the control method of claim 18 further comprises the step of holding the channel-switching valve in a switch state in which the one and the other one of the indoor heat exchanger and the outdoor heat exchanger are determined by the difference in pressure between the high pressure fluid and the low pressure fluid, with the high pressure fluid channel and the low pressure fluid channel being unconnected inside the channel-switching valve.

DESCRIPTION OF THE PREFERRED EMBODIMENTS

Structure of the Refrigerating Cycle of the First Embodiment

Figure 1:
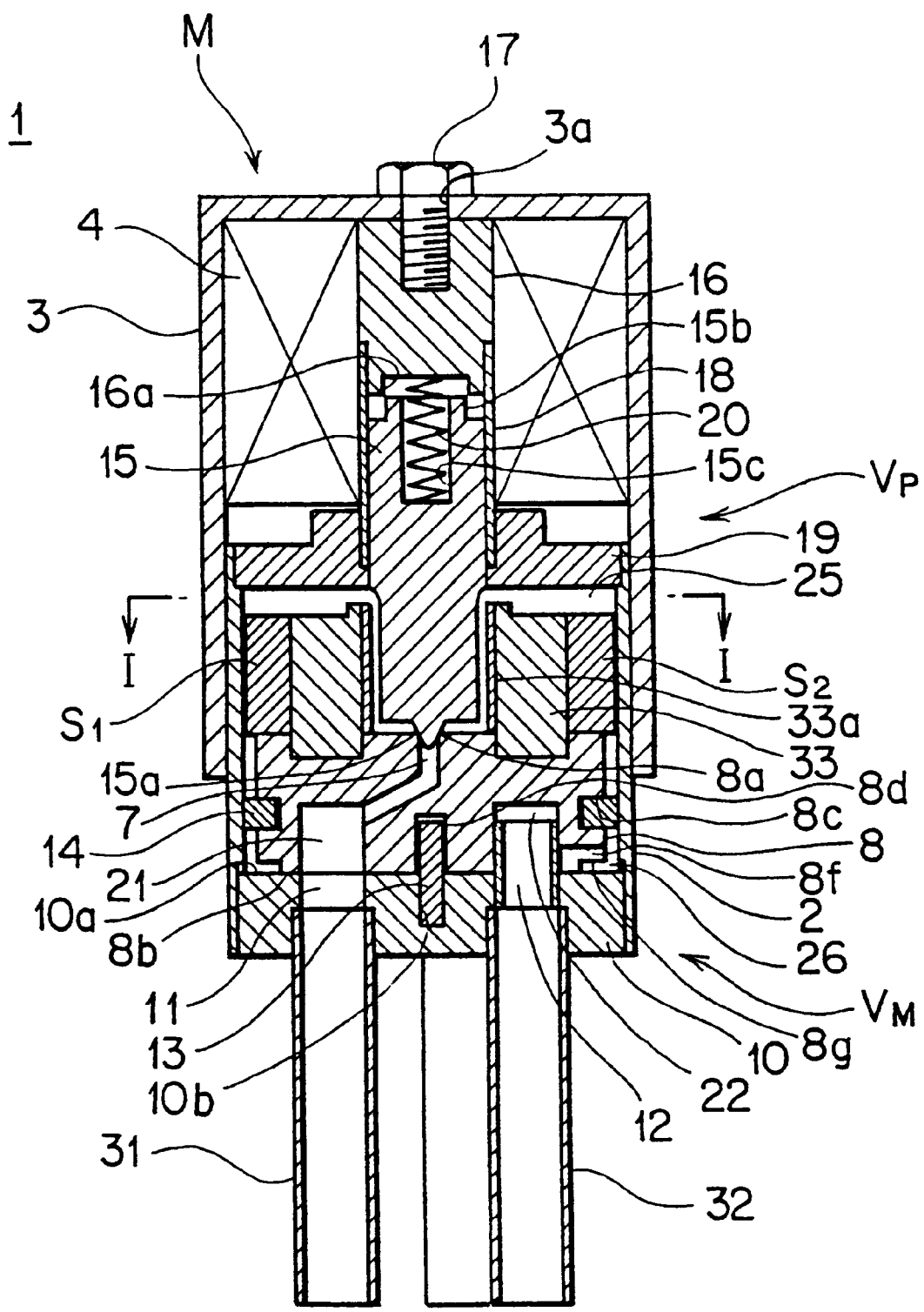
FIG. 1 is a sectional view of a four-way valve in a holding state in the refrigerating cycle of the first embodiment of the present invention.

The following is a description of the structure of a four-way valve used as a channel-switching valve in the refrigerating cycle of the first embodiment of the present invention, with reference to the sectional view of FIG. 1.

The four-way valve 1 comprises a valve housing 2, a main valve $V_m$, a pilot valve $V_p$, and a magnetic circuit M.

The valve housing 2 is cylindrical and open at both ends, and the upper end of it is inserted into and closed by the lower open end of a casing 3.

A non-magnetic spacer 19 is placed on the upper end of the valve housing 2 and below an electromagnetic coil 4. A main valve element 3 is rotatably provided inside the valve housing 2, and a main valve seat 10 is fixed to the lower end of the valve housing 2.

The main valve $V_m$ comprises the lower portion of the main valve element 8 and the main valve seat 10.

The main valve element 8 is disposed inside the valve housing 2, and the bottom surface 8b of the main valve element 8 serves as a contact surface with the top surface 10a of the main valve seat 10.

Figure 2:
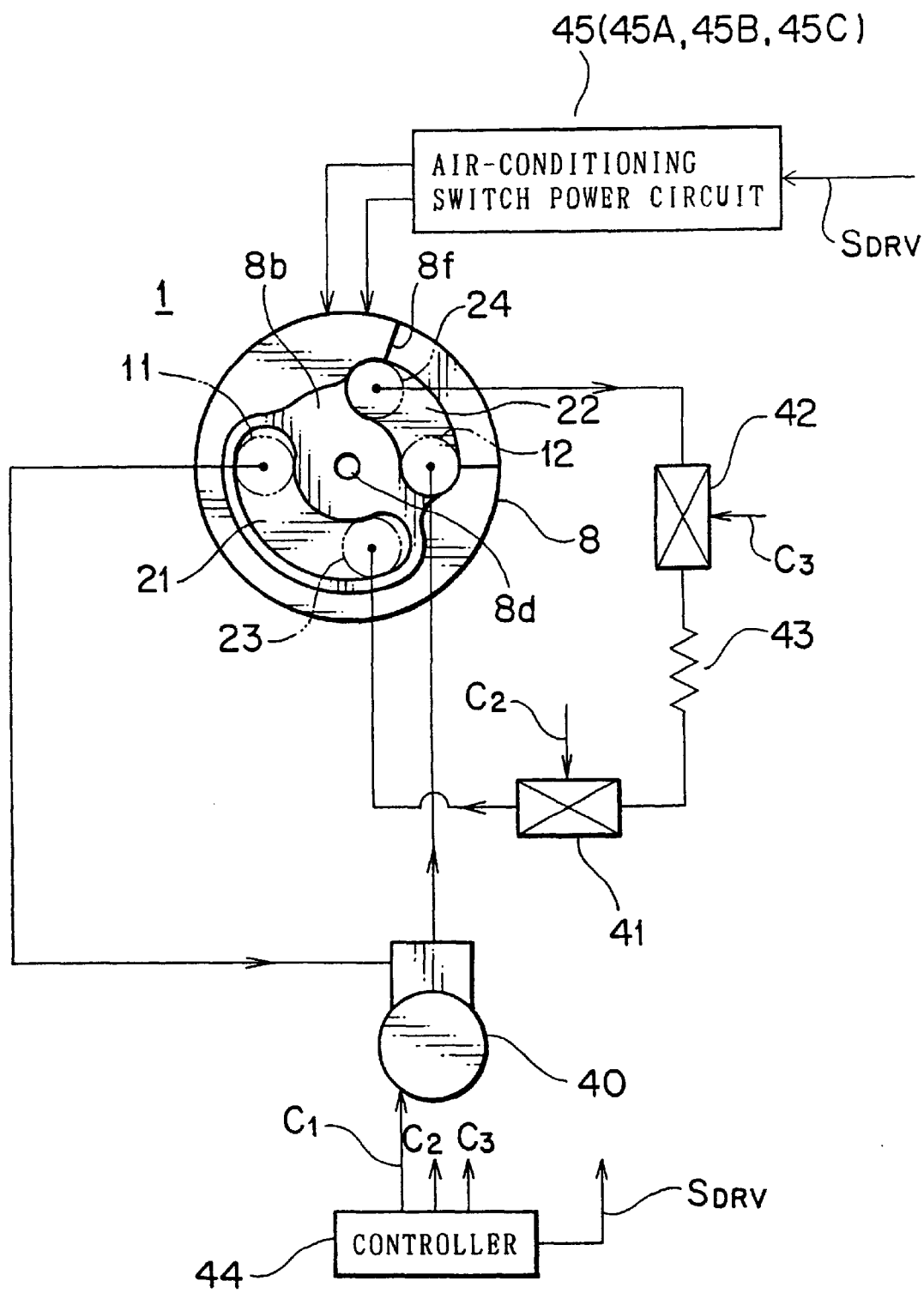
FIG. 2 is a schematic view of the refrigerating cycle in the cooling mode, including the four-way valve (a bottom view of the main valve element is shown) of FIG. 1.

FIG. 2 is a schematic view of the refrigerating cycle.

The refrigerating cycle CC is controlled by the four-way valve 1 and a control signal $C_1$, and comprises: a compressor 40 which is supplied from the four-way valve 1 with an expanded refrigerant as a low pressure fluid, compresses the expanded refrigerant, and sends the compressed refrigerant as a high pressure fluid back to the four-way valve 1; an indoor heat exchanger 41 which is disposed indoors, controlled by a control signal $C_2$, and conducts heat exchange by the refrigerant; an outdoor heat exchanger 42 which is disposed outdoors, controlled by a control signal $C_3$, and conducts heat exchange by the refrigerant; a controller 44 which outputs the control signals $C_1$ to $C_3$ and an operation mode control signal $S_{div}$ to control the entire refrigerating cycle CC; and an air-conditioning switch power circuit 45 which supplies electric power to the electromagnetic oil 4 based on the operation mode control signal $S_{div}$.

Figure 3A:
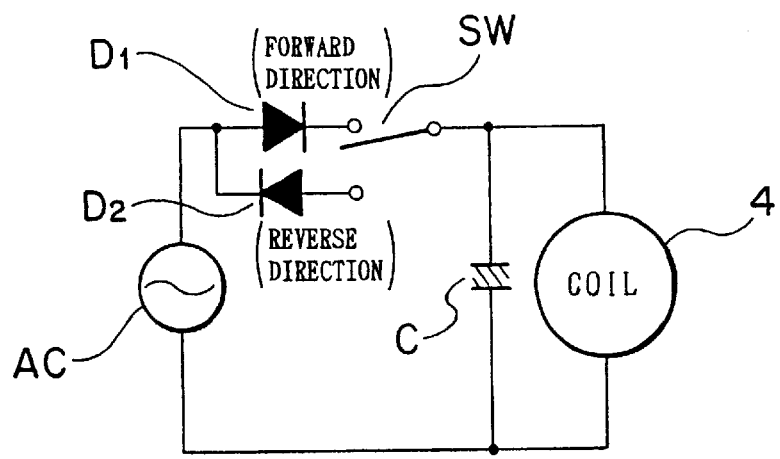
FIG. 3 illustrates the air-conditioning switch power circuit used in the switching operation of the four-way valve of FIG. 1.
Figure 3B:
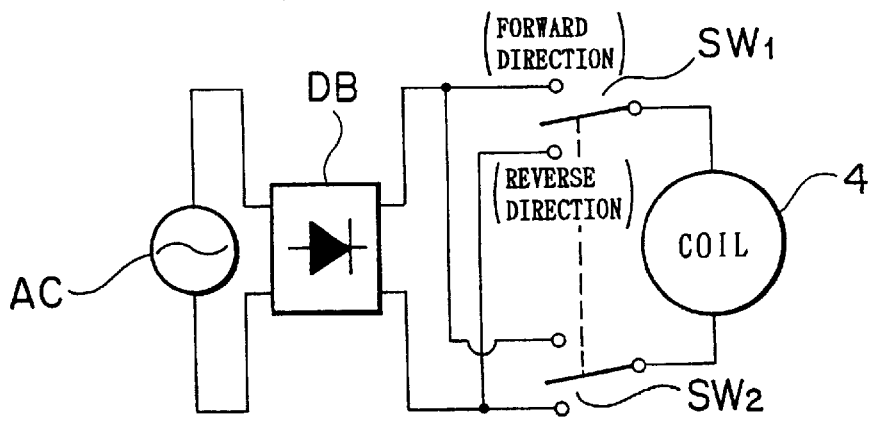
Figure 3C:
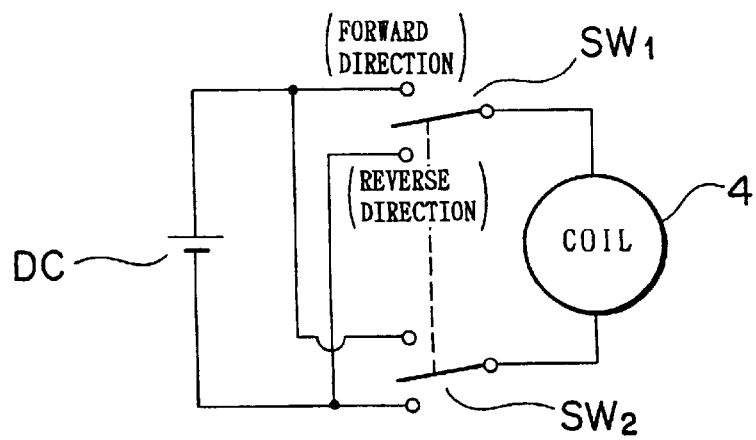

FIGS. 3A to 3C illustrates an example of the structure of the air-conditioning switch power circuit.

As a first example of the air-conditioning switch power circuit, FIGS. 3A to 3C show an air-conditioning switch power circuit 45A which comprises: a first diode $D_1$ which is connected in series with an ac power source AC and performs half-wave retification when a forward current is applied to the electromagnetic coil 4; a second diode $D_2$ which is connected in parallel with the first diode $D_1$ and performs half-wave rectification when a reverse current is applied to the electromagnetic coil 4; a switch SW which connects the electromagnetic oil 4 either to the first diode $D_1$ or to the second diode $D_2$ based on the operation mode control signal $S_{div}$ representative of the current operation mode; and a condenser C connected in parallel with the electromagnetic coil 4.

As a second example of the air-conditioning switch power circuit, FIG. 3B shows an air-conditioning switch power circuit 45B which comprises: a diode bride DB which is connected to an ac power source AC and performs full-wave rectification; and switches $SW_1$ and $SW_2$ which can be switched simultaneously based on the operation mode control signal $S_{div}$ when a forward current or a reverse current is applied to the electromagnetic coil 4.

As a third example of the air-conditioning switch power circuit, FIG. 3C shows an air-conditioning switch power circuit 45C comprising switches $SW_1$ and $SW_2$ which are connected to a dc power source DC, and can be switched simultaneously based on the operation mode control signal $S_{div}$ when a forward current or a reverse current is applied to the electromagnetic coil 4.

Referring to FIGS. 1, 2, 4, 5, and 6, the structure of the main valve element 8 will be explained below.

As shown in FIG. 2, a connecting groove 21 connecting an outlet 11 to a connecting hole 23 is formed on the bottom surface 8b of the main valve element 8. The outlet 11 is formed through the main valve seat 10, and communicates with the refrigerant inlet of the compressor 40 in a cooling mode. The connecting hole 23 communicates with the indoor heat exchanger 41.

A guide groove 22 connecting an inlet 12 to a connecting hole 24 is also formed on the bottom surface 8b of the main valve element 8. The inlet 12 communicates with the refrigerant outlet of the compressor 40. The connecting hole 24 is formed through the main valve seat 10, and communicates with the outdoor heat exchanger 42.

A shaft slot 8d is formed in the center of the bottom surface 8b of the main valve element 8, and a shaft 13 is inserted into the shaft slot 8d. The main valve element 8 is rotatably attached to the main valve seat 10 by the shaft 13.

A piston ring 14 is fitted between the side concave portion 8c of the main valve element 8 and the inner wall of the valve housing 2.

Figure 5:
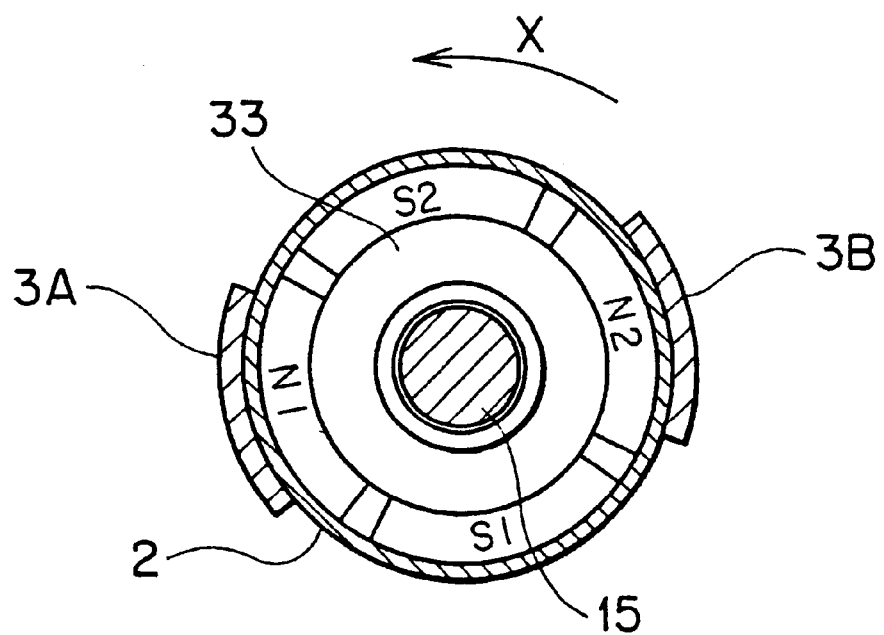
FIG. 5 is a sectional view, taken along the line I—I of FIG. 1, of the four-way valve in the cooling mode, the dehumidifying mode, and the defrosting mode of the refrigerating cycle of FIG. 2, illustrating the positional relationship between the casing, the non-permeable yoke, and the permanent magnets.
Figure 6:
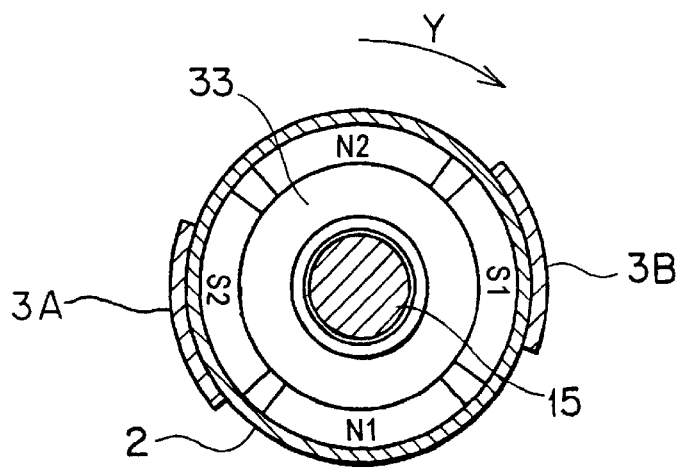
FIG. 6 is a sectional view, taken along the line I—I of FIG. 1, of the four-way valve in the heating mode of the refrigerating cycle of FIG. 2, illustrating the positional relationship between the casing, the non-permeable yoke, and the permanent magnets.

As shown in FIGS. 5 and 6, a cylindrical permeable yoke 33 is provided to the upper portion of the main valve element 8. The permeable yoke 33 is provided with permanent magnets $S_1$, $S_2$, $N_1$, and $N_2$. The main valve element 8 is rotated by energizing the electromagnetic coil 4 so as to switch the ports 11, 12, 23, and 24.

The piston ring 14 is provided with a slit (not shown) by cutting out a part of it in the circumferential direction of the main valve element 8, and the outer diameters of the permanent magnets $S_1$, $S_2$, $N_1$, and $N_2$ are made smaller than the inner diameter of the valve housing 2. A leak channel is formed by the gap between the valve housing 2 and the permanent magnets $S_1$, $S_2$, $N_1$, and $N_2$, the slit of the piston ring 14, and the gap between the circumferential surface of the valve main element 8 and the inner wall of the valve housing 2.

As shown in FIG. 1, a step portion 8g is formed at the outer rim of the bottom surface 8b of the main valve element 8. With the bottom surface 8b of the main valve element 8 being in contact with the main valve seat 10, a space 29 is formed by the step portion 8g and the main valve seat 10 in the lower portion of the main valve element 8. The guide groove 22 of the main valve element 8 communicates with the periphery of the main valve element 8 via a notch 8f formed on the bottom surface 8b of the main valve element 8. Thus, the guide groove 22 communicates with a space above the main valve element 8, i.e., a space 25 between the non-magnetic spacer 19 and the main valve element 8, via the notch 8f, the space 26 below the main valve element 8, and the leak channel.

Figure 4:
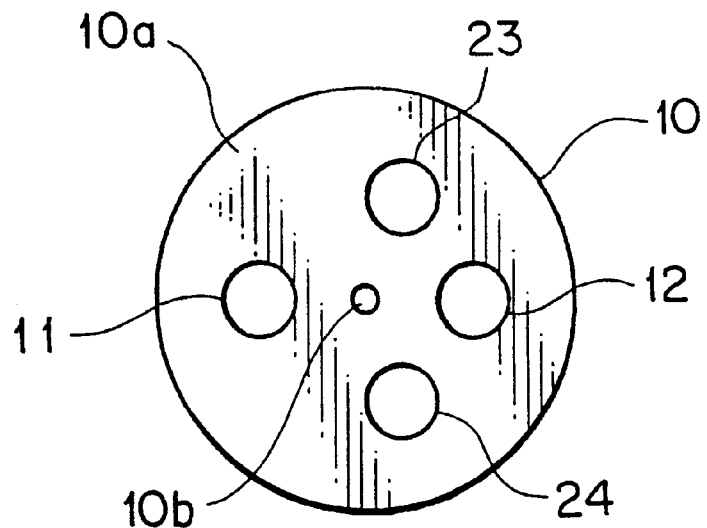
FIG. 4 is a plan view of the main valve seat of the four-way valve of FIG. 1.

The disk-type main valve seat 10, is situated below the main valve element 8. The main valve seat 10 is tightly bonded to the lower portion of the inner surface of the valve housing 2 by soldering. As shown in FIG. 4, the outlet 11 and the inlet 12, and the two connecting holes 23 and 24 are formed through the valve main seat 10.

The outlet 11 is provided with a low pressure port 31 communicating with the refrigerant inlet of the compressor 40 in the refrigerant cycle.

The inlet 12 is provided with a high pressure port 32 communicating with the refrigerant outlet of the compressor 40. Here, the port with the inlet 12 protrudes inside the guide groove 22, as shown in FIG. 1, and serves as a stopper for the rotatable main valve element 8.

The top surface 10*a* of the main valve seat 10 is the contact surface with the bottom surface 8*b* of the main valve element 8. A shaft slot 10*b* is formed in the center of the top surface 10*a*, and the shaft 13 is inserted into the hole 10*b*.

With the structure of the main valve $V_m$, in a cooling mode, the outlet 11 communicates with the connecting hole 23 while the inlet 12 communicates with the connecting hole 24, as shown in FIG. 2.

Figure 7:
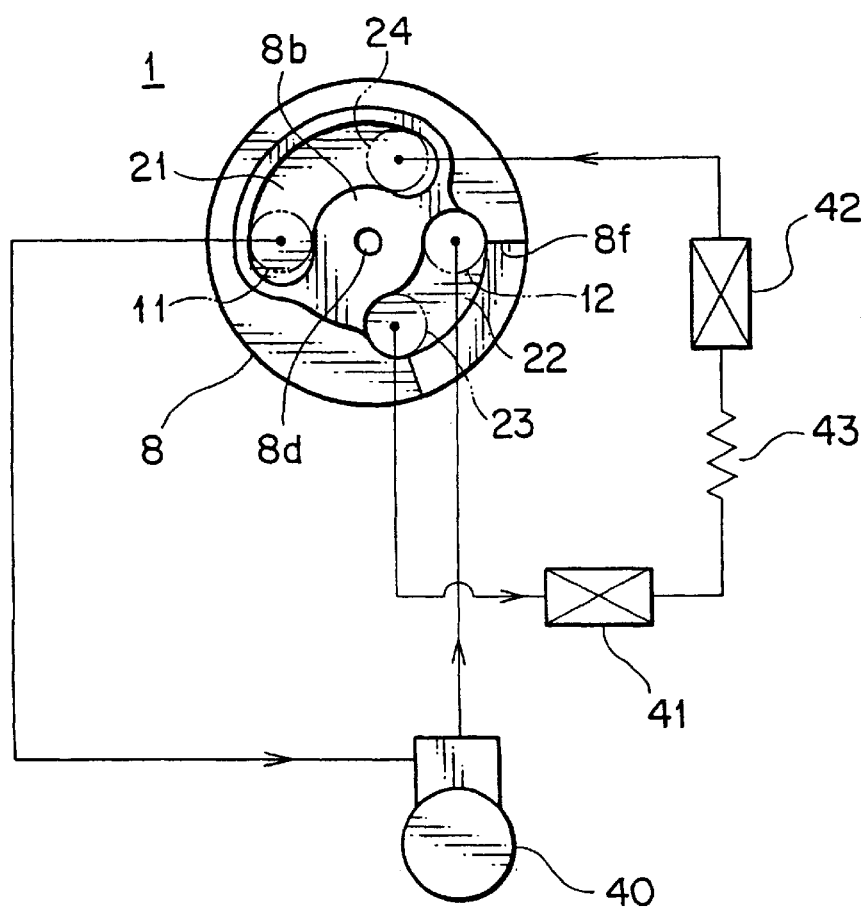
FIG. 7 illustrates the operation in the heating mode of the refrigerating cycle of FIG. 2 (with a bottom view of the main valve element)

In a heating mode, the outlet 11 communicates with the connecting hole 24 while the inlet 12 communicates with the connecting hole 23, as shown in FIG. 7. It should be noted here that in FIG. 7, the controller 44 and the air-conditioning switch power circuit 45 (45A–45C) are not shown.

As described so far, the four-way valve of this embodiment can easily switch between a cooling mode and a heating mode.

Referring back to FIG. 1, the explanation moves on to the pilot valve $V_p$.

A pilot port 7 is formed in the upper middle of the main valve element 8, and a pilot valve seat 8*a* is formed at the end of pilot port 7. The pilot port 7 communicates with the connecting groove 21.

A plunger 15 is cylindrically formed, and a pilot valve element 15*a* protrudes from the center of the bottom surface of the plunger 15. The pilot valve element 15*a* and the pilot valve seat 8*a* formed on the main valve element 8 make up a pilot valve. A cylindrical protruding portion 15*b* is formed around the upper portion of the plunger 15, and can be accommodated in a lower concave portion 16*a* of a suction member 16 situated above the plunger 15. Furthermore, a coil spring attachment hole 15*c* is formed in the upper middle of the plunger 15 in the axial direction of the plunger 15, and a plunger spring 20 as a compression coil spring is inserted into the attachment hole 15*c*.

With the plunger spring 20 being inserted into the coil spring attachment hole 15*c*, the upper end of the plunger 20 is brought into contact with the lower concave portion 16*a* of the suction member 16. The plunger spring 20 energizes the plunger 15 toward the pilot valve seat 8*a* and the pilot port 7, i.e., in such a direction as to close the valve.

Next, the explanation moves on to the magnetic circuit M shown in FIG. 1.

The magnetic circuit M comprises the permeable yoke 33 provided to the suction member 16, the casing 3, and the main valve element 8, the permanent magnets $S_1$, $S_2$, $N_1$, and $N_2$, and the plunger 15. The magnetic circuit M is used for driving the main valve $V_m$ and the pilot valve $V_p$.

Above the plunger 15, the suction member 16 is tightly held between a plunger tube 18 and the casing 3.

The casing 3 is disposed outside the electromagnetic coil 4, and secured with the electromagnetic coil 4 on the top of the suction member 16 by an attachment bolt 17.

The casing 3 has a cylindrical shape, with its lower end open. A bolt slot 3*a* is formed in the upper middle of the casing 3, and the attachment bolt 17 is inserted into the bolt slot 3*a* so as to secure the casing 3 to the suction member 16. Besides the suction member 16, the electromagnetic coil 4 and the plunger tube 18 are disposed inside the upper portion of the casing 3. The valve housing 2 is inserted and secured in the lower open end of the casing 3.

As shown in FIGS. 5 and 6, the lower portion of the casing 3 is provided with two tongues 3A and 3B, and the four permanent magnets $S_1$, $S_2$, $N_1$, and $N_2$, which rotate as a rotor along with the valve main element 8, are disposed inside the casing 3.

The permeable yoke 33 (shown in FIGS. 1, 5, and 6) is cylindrical in shape, and a slot 33*a* for receiving the plunger 15 is formed in the center. The plunger 15 slides inside the slot 33*a*.

The cylindrical plunger 15 is slidably situated inside the slot 33*a* formed in the middle of the permeable yoke 33, and the cylindrical protruding portion 15*b* is provided to its upper portion. When the plunger 15 is attracted to the suction member 16, the cylindrical protruding portion 15*b* is accommodated in the lower concave portion 16*a*.

Referring now to FIGS. 1 and 8 to 10, the explanation moves on to the operation of an air conditioner with the refrigerating cycle described above, and more specifically, the operation of the four-way valve.

First, a user selects one operation mode among three operation modes of a cooling mode, a dehumidifying mode, and a heating mode (step S1).

An initial setting operation corresponding to the operation mode selected in step S1 is performed (steps S2-1 to S2-3).

The controller 44 starts driving the air conditioner in the selected operation mode, and outputs an operation mode control signal $S_{drv}$ to the air-conditioning switch power circuit 45, so that the power circuit 45 supplies electric power corresponding to the operation mode to the four-way valve 1 for 2 to 60 seconds (step S3). Thus, the channels can be switched in accordance with the operation mode.

As to the current corresponding to each operation mode, a forward current shown in FIGS. 3A to 3C is applied in the cooling mode, the dehumidifying mode, and the defrosting mode, and a reverse current shown in FIGS. 3A and 3C is applied in the heating mode.

The explanation now moves on to the channel-switching operation of the four-way valve. It should be noted here that the initial mode is the cooling mode.

FIG. 1 shows a non-energized state (channel holding state) of the electromagnetic coil 4 in the cooling mode. In such a state, the refrigerant flows from the outlet 11 communicating with the inlet of the compressor 40 to the connecting hole 23 communicating with the outlet of the indoor heat exchanger 41 via the connecting groove 21 in the refrigerating cycle.

Thus, the refrigerant circulates in the following order: the compressor 40→the four-way valve 1→the outdoor heat exchanger 42→a throttle 43→the indoor heat exchanger 41→the four-way valve 1→the compressor 40.

Since the guide groove 22 connects the space 26 situated below the notch 8*f* and the main valve element 8 with the space 25 situated above the main valve element 8 via the leak channel, the high temperature and high pressure refrigerant discharged from the outlet of the compressor 40 is introduced into the space 25 situated above the main valve element 8. As a result, the pressure on the main valve element 8 from above becomes the same as the pressure from the high temperature and high pressure refrigerant.

When the operation modes are switched in the above state, the controller 44 outputs an operation mode control signal $S_{drv}$ to the air-conditioning switch power circuit 45 so as to magnetize the electromagnetic coil 4 in such a way that the casing 3 becomes a north pole. The air-conditioning switch power circuit 45 then starts supplying electric power to the electromagnetic coil 4 of the four-way valve 1 to put the electromagnetic coil 4 in a magnetized state.

Figure 10:
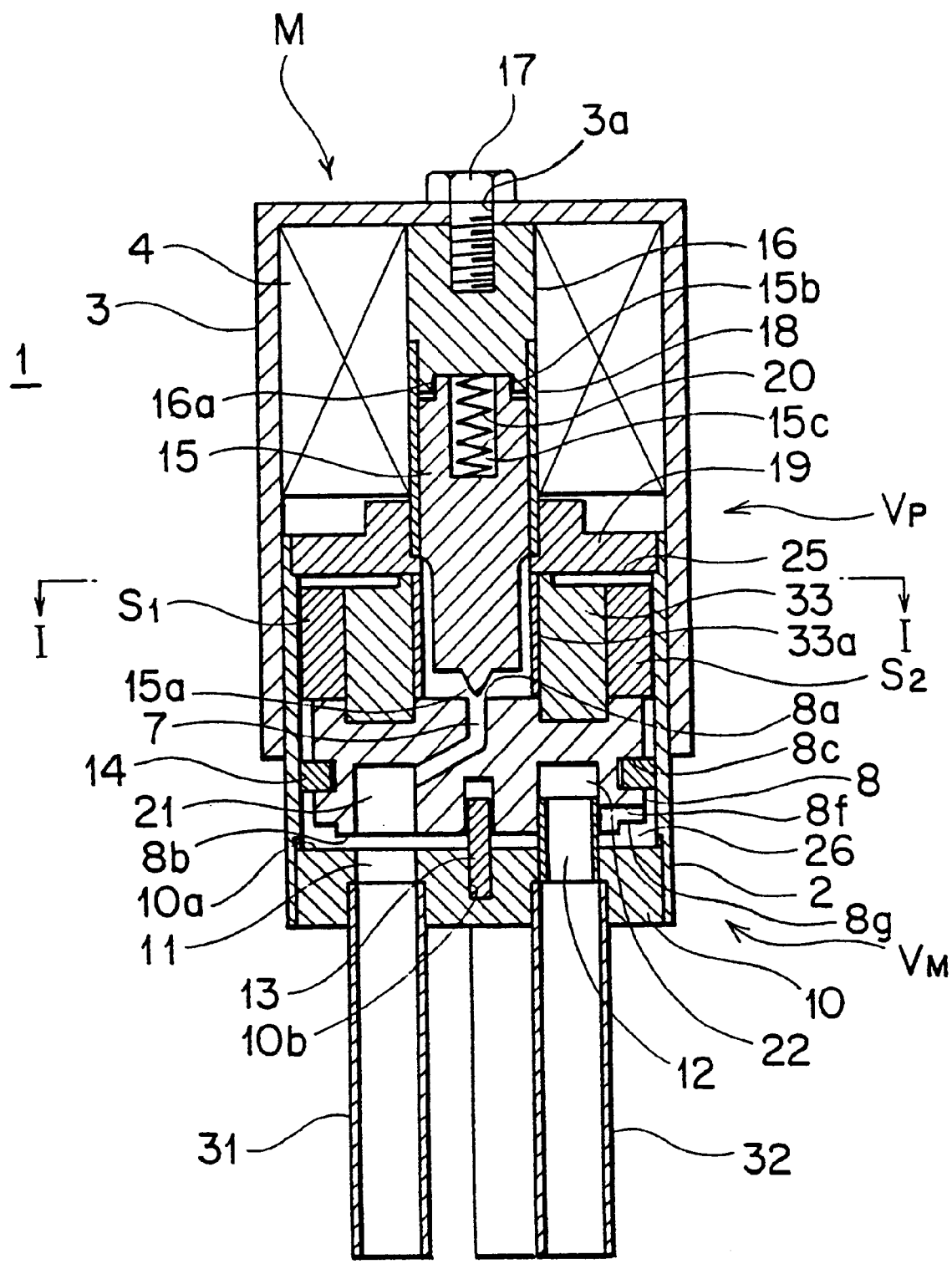
FIG. 10 is a sectional view of the four-way valve of FIG. 1 during the switching operation.

In the magnetic circuit M, the suction member 16 attracts the plunger 15 to detach it from the pilot valve seat 8a of the main valve element 8, thereby leaving the pilot port 7 in an open state. The high pressure refrigerant in the space 25 above the main valve element 8 then flows toward the low pressure side via the pilot port 7 in a larger amount than that of the high pressure refrigerant flowing out of the space 26 below the main valve element 8 into the upper space 25 via the leak channel. As a result, the refrigerant pressure in the space 25 above the main valve element 8 becomes lower than the refrigerant pressure in the guide groove 22 of the main valve element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the connecting holes 23 and 24 are respectively connected via the space formed between the main valve element 8 and the main valve seat 10. Because of this, the refrigerant pressures in the four places are forced to become substantially uniform.

Furthermore, the permanent magnet $N_1$ is repelled by the tongue 3A, the permanent magnet $S_1$ is attracted to the tongue 3B, the permanent magnet $N_2$ is repelled by the tongue 3B, and the permanent magnet $S_2$ is attracted to the tongue 3A. The main valve element 8 rotates in the X direction and shifts from the position shown in FIG. 5 to the position shown in FIG. 6.

As a result, the connecting groove 21 connects the outlet 11 communicating with the refrigerant inlet of the compressor 40 to the connecting hole 24 communicating with the outdoor heat exchanger 42, and the refrigerant circulates in the following order: the compressor 40→the four-way valve 1→the indoor heat exchanger 41→the throttle 43→the outdoor heat exchanger 42→the four-way valve 1→the compressor 40. The refrigerating cycle is thus switched to the heating mode.

Now returning to the explanation of the process after the normal start of the air conditioner in the operation mode selected by the channel-switching operation in step S3, the controller 44 continues the normal operation by driving the compressor 40, but stops outputting the operation mode control signal $S_{drv}$ to the air-conditioning switch power circuit 45. The air-conditioning switch power circuit 45 then stops supplying electric power to the electromagnetic coil 4 of the four-way valve 1, thereby putting the electromagnetic coil 4 in a non-magnetized state.

The plunger 15 is then pushed down again by the plunger spring 20 so as to put the pilot valve seat 8a of the main valve element 8 in a closed state (step S4).

The high pressure refrigerant then stops flowing from the space 25 above the main valve element 8 toward the low pressure side via the pilot port 7, and as a result, the main valve element 8 is pushed by the high pressure refrigerant flowing into the upper space 25 from the space 26 below the main valve element 8 via the leak channel. Thus, the main valve element 8 descends and brought into contact with the main valve seat 10.

Here, the positional relationship between the main valve element 8 and the main valve seat 10 changes from the situation shown in FIG. 2 to the situation shown in FIG. 7. Also, the permanent magnet $S_1$ is attracted to the tongue 3B, while the permanent magnet $S_2$ is attracted to the tongue 3A. Thus, the positions of the permanent magnets are maintained as shown in FIG. 6.

During the normal operation of the air conditioner in the operation mode selected in step S1, when room temperature reaches the temperature predetermined in selecting the operation mode, and the thermostat is turned off, the controller 44 stops the compressor 40. At this point, the power supply from the air-conditioning switch power circuit 45 to the electromagnetic coil 4 of the four-way valve 1 remains stopped (step S5).

Figure 8:
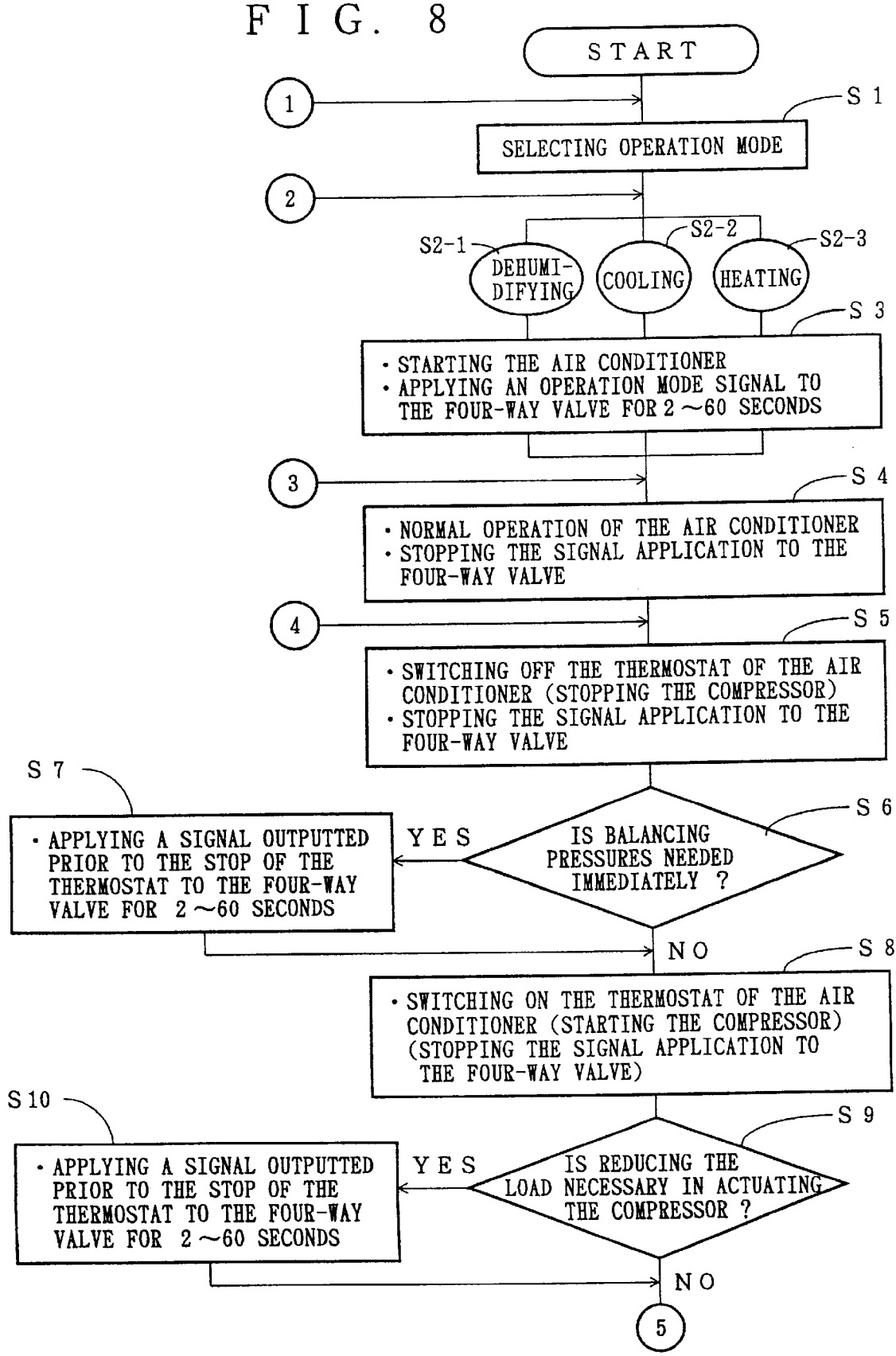
FIGS. 8 and 9 are operation flowcharts of the refrigerating cycle of FIG. 2.
Figure 9:
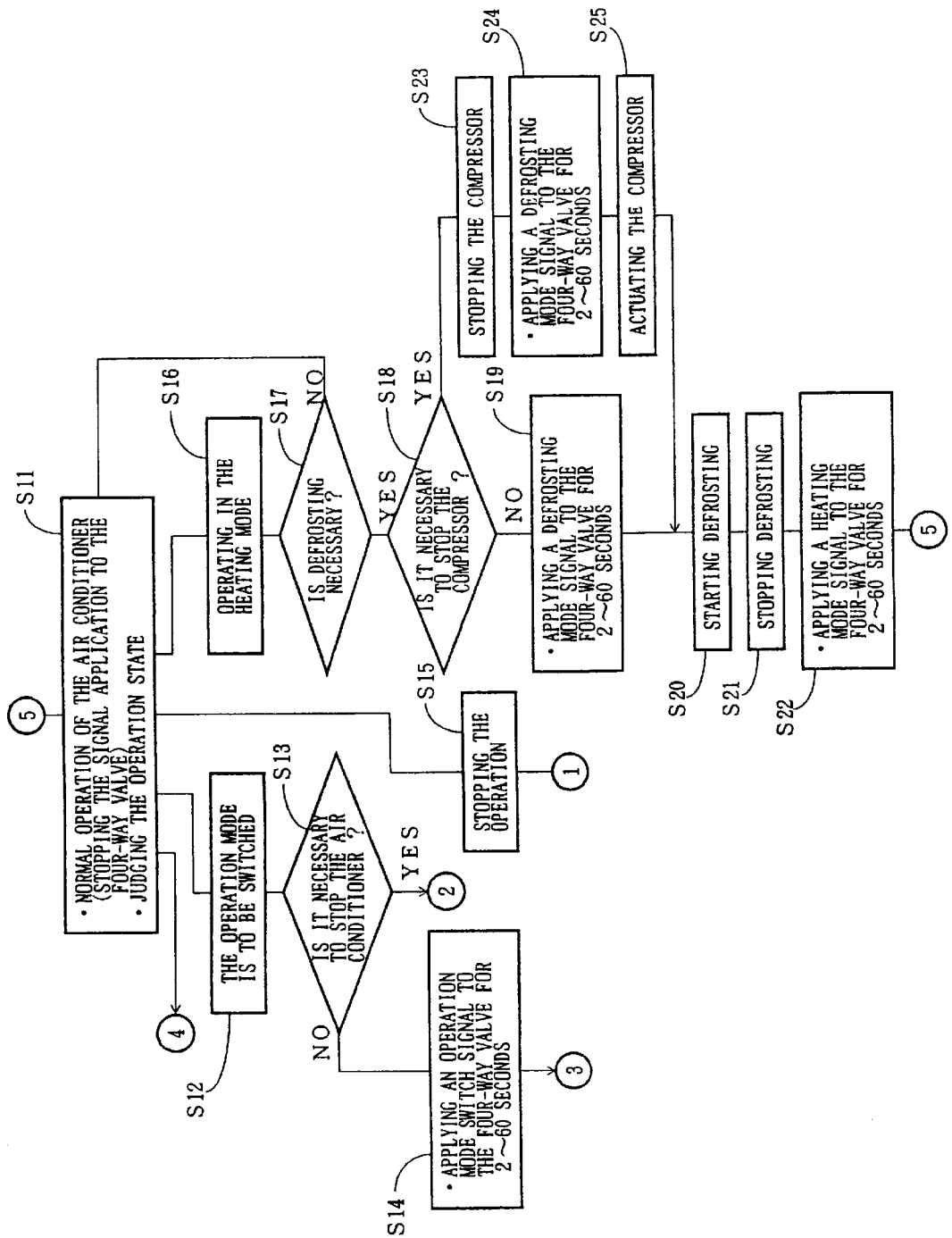

All the processes between step S5 and step S10 should be skipped if room temperature does not reach the predetermined temperature within a certain period of time, though this is not mentioned in FIG. 8.

As described above, when the thermostat is turned off and the compressor 40 is stopped as room temperature reaches the predetermined temperature, the controller 44 then judges whether it is necessary to balance immediately the pressures at the refrigerant inlet and at the refrigerant outlet of the compressor 40 (step S6).

In the judgment in step S6, if it is necessary to balance the pressures immediately (step S6: Yes), a current in the forward direction or the reverse direction, whichever is applicable to the operation mode before the stop of the thermostat, is applied to the electromagnetic coil 4 for 2 to 60 seconds (step S7), and the operation then moves on to step S8.

As described above, when the operation mode is switched from the cooling mode to the heating mode, and the normal operation is started in the heating mode, the controller 44 outputs the operation mode control signal $S_{drv}$ to the air-conditioning switch power circuit 45 for 2 to 60 seconds, so that a reverse current applicable to the heating mode prior to a stop of the thermostat is applied to the electromagnetic coil 4 of the four-way valve 1 from the air-conditioning switch power circuit 45 for 2 to 60 seconds.

In the magnetic circuit M in the process of step S7, the plunger 15 is attracted to the suction member 16 and thus separated from the pilot valve seat 8a of the main valve element 8, thereby leaving the pilot port 7 in an open state. The high pressure refrigerant in the space 25 above the main valve element 8 then flows toward the low pressure side via the pilot port 7 in a larger amount than that of the high pressure refrigerant flowing into the upper space 25 from the space 26 below the main valve element 8 via the leak channel. Because of this, the refrigerant pressure in the space 25 above the main valve element 8 becomes lower than the refrigerant pressure in the guide groove 22 of the main valve element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the main valve seat 10, so that the refrigerant pressures in all the four places are forced to become substantially uniform. Thus, the pressures can be quickly balanced.

Meanwhile, if it is judged in step S6 that there is no need to balance the pressures immediately (step S6: No), step S7 is skipped, and the operation moves on the step S8.

In step S8, the controller 44 restarts the compressor 40 when the thermostat is turned on as room temperature does not reach the predetermined temperature. The normal operation of the air conditioner in the operation mode selected in step S1 is thus restarted and continued. In this case, the heating mode is maintained.

When the restarting the compressor 40, the controller 44 judges whether it is necessary to reduce the starting load of the compressor 40 (step S9).

If it is judged that the starting load of the compressor 40 needs to be reduced in step S9 (step S9: Yes), a forward current or a reverse current, whichever is applicable to the operation mode before the stop of the thermostat, is applied to the electromagnetic coil 4 for 2 to 60 seconds (step S10), and the operation then moves on to step S11.

In this case, the controller 44 outputs the operation mode control signal $S_{drv}$ to the air-conditioning switch power circuit 45 for 2 to 60 seconds, so that a reverse current applicable to the heating mode before the stop of the thermostat is applied to the electromagnetic coil 4 of the four-way valve 1 from the air-conditioning switch power circuit 45 for 2 to 60 seconds.

In the magnetic circuit M in step S10, the plunger 15 is attracted to the suction member 16, and thus separates from the pilot valve seat 8a of the main valve element 8, thereby putting the pilot port 7 in an open state. The high pressure refrigerant in the space 25 above the main valve element 8 then flows toward the low pressure side via the pilot port 7 in a larger amount than that of the high pressure refrigerant flowing into the upper space 25 from the space 26 below the main valve element 8 via the leak channel. Because of this, the refrigerant pressure in the space 25 above the main valve element 8 becomes lower than the refrigerant pressure in the guide groove 22 of the main element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the main valve seat 10, so that the refrigerant pressure in all the four places are forced to become substantially uniform. Thus, the pressures at the refrigerant inlet and at the refrigerant outlet of the compressor 40 can be quickly balanced.

Meanwhile, if it is judged in step S9 that there is no need to reduce the starting load of the compressor 40 (step S9: No), step S10 is skipped, and the operation moves on to step S11.

In step S11, the controller 44 controls the air conditioner started in step S8 to continue the normal operation in the operation mode selected in step S1, and also judges whether it is necessary to switch the operation mode of the air conditioner in accordance with an instruction as to switching the operation mode (step S11).

At this point, the application of the reverse current to the electromagnetic coil 4 of the four-way valve 1, which was started in step S10, has already been stopped, and the main valve element 8 is in contact with the main valve seat 10, putting the pilot valve seat 8a of the main valve element 8 in a closed state.

If it is judged in step S11 that the normal operation in the current operation mode as no instruction to switch the operation mode is issued, and if the continued operation mode is not the heating mode, the controller 44 moves back to step S5, and repeats the same procedures.

If an instruction to switch the operation mode is issued (step S12), the controller 44 judges whether it is necessary to stop the air conditioner (step S13).

If it is judged in step S13 that the air conditioner needs to be stopped (step S13; Yes), the operation moves back to step S2-1, S2-2, or S2-3, and the same procedures are repeated.

If it is judged in step S13 that there is no need to stop the air conditioner (step S13: No), the controller 44 applies a current applicable to the switched operation mode to the electromagnetic coil 4 for 2 to 60 seconds, so as to start the air conditioner in the switched operation mode (step S14). Thus, the channel is switched to one corresponding the switched operation mode.

At this point, the high temperature and high pressure refrigerant discharged from the outlet of the compressor 40 puts the same amount of pressure on the main valve element 8 from both above and below via the inlet 12. Based on the instruction to switch the operation mode, the operation mode control signal $S_{drv}$ is outputted to the air-conditioning switch power circuit 45, so that a reverse current is applied to the electromagnetic coil 4 of the four-way valve 1 to magnetize the electromagnetic coil 4 in a manner that makes the casing 3 the north pole or the south pole depending on the switched operation mode.

In the magnetic circuit M, the plunger 15 is attracted to the suction member 16, and thus separates from the pilot valve seat 8a of the main valve element 8, thereby putting the pilot port 7 in an open state. The high pressure refrigerant in the space 25 above the main valve element 8 flows toward the low pressure side via the pilot port 7 in a larger amount than that of the high pressure refrigerant flowing into the upper space 25 from the space 26 below the main valve element 8 via the leak channel. Because of this, the refrigerant pressure in the space 25 above the main valve element 8 becomes lower than the refrigerant pressure in the guide groove 22 of the main valve element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the main valve seat 10, so that the refrigerant pressures in all the four places are forced to become substantially uniform.

In the switched operation mode, the permanent magnet $N_1$ is repelled by or attracted to the tongue 3A; the permanent magnet $S_1$ is attracted to or repelled by the tongue 3B; the permanent magnet $N_2$ is repelled by or attracted to the tongue 3B; and the permanent magnet $S_2$ is attracted to or repelled by the tongue 3A. In the former case, the main valve element 8 rotates and shifts from the position shown in FIG. 5 in the X direction to the position shown in FIG. 6. In the latter case, the main valve element 8 rotates and shifts from the position shown in FIG. 6 in the Y direction to the position shown in FIG. 5.

As a result, the actual operation mode of the refrigerating cycle is switched.

If the air conditioner (the refrigerating cycle) is stopped (step S15), the operation moves back to step S1, and the refrigerating cycle is put in a stand-by condition.

If the normal operation in the current operation mode is continued as no instruction to switch the operation mode is issued, and if the current operation mode is the heating mode, the current operation mode is continued (step S16). After a certain period of time, whether it is necessary to switch the operation mode to the defrosting mode is judged (step S17).

It is judged in step S17 that there is no need to switch the operation mode to the defrosting mode (step S17: No), the operation moves back to step S11, and the same procedures are repeated.

If it is judged in step S17 that it is necessary to switch the operation mode to the defrosting mode (step S17: Yes), whether the compressor 40 should be stopped is judged (step S18). The compressor 40 needs to be stopped if the amount of frost in the outdoor heat exchanger 42 is large. Otherwise, the compressor 40 would make a big noise.

It is judged in step S18 that there is no need to stop the compressor 40, i.e., if the amount of frost in the outdoor heat exchanger 42 is small (step S18: No), the operation mode control signal $S_{drv}$ is outputted to the air-conditioning switch power circuit 45 for 2 to 60 seconds, so that a forward current is applied to the electromagnetic coil 4 of the four-way valve 1 for 2 to 60 seconds to magnetize the electromagnetic coil 4 in a manner that makes the casing 3 the south pole (step S19).

In the magnetic circuit M at this point, the plunger 15 is attracted to the suction member 16, and thus separates from the pilot valve seat 8a of the main valve element 8, thereby putting the pilot port 7 in an open state. The high pressure refrigerant in the space 25 above the main valve element 8 then flows toward the low pressure side via the pilot port 7 in a larger amount than that of the high pressure refrigerant flowing into the upper space 25 from the space 26 below the main valve element 8. Because of this, the refrigerant pressure in the space 25 above the main valve element 8 becomes lower than the refrigerant pressure in the guide groove 22 of the main valve element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the main valve seat 10, so that the refrigerant pressures in all the four places are forced to become substantially uniform.

The permanent magnet $N_1$ is attracted to the tongue 3A; the permanent magnet $S_1$ is repelled by the tongue 3B; the permanent magnet $N_2$ is attracted to the tongue 3B; and the permanent magnet $S_2$ is repelled by the tongue 3A. The valve main element 8 rotates in the Y direction and shifts from the position shown in FIG. 6 to the position shown in FIG. 5.

As a result, the connecting groove 21 connects the outlet 11 communicating with the refrigerant inlet of the compressor 40 to the connecting hole 23 communicating with the indoor heat exchanger 41, and the refrigerant circulates the following order: the compressor 40→the four-way valve 1→the outdoor heat exchanger 42→the throttle 43→the indoor heat exchanger 41→the four-way valve 1→the compressor 40. Thus, the operation mode of the refrigerating cycle is switched from the heating mode to the defrosting mode, and the refrigerating cycle starts defrosting (step S20).

When the defrosting comes to a stop after a certain period of time (step S21), the controller 44 outputs the operation mode control signal $S_{drv}$ to the air-conditioning switch power circuit 45 for 2 to 60 seconds, so that a reverse current is applied to the electromagnetic coil 4 of the four-way valve 1 for 2 to 60 seconds to magnetize the electromagnetic coil 4 in a manner that makes the casing 3 the north pole.

In the magnetic circuit M at this point, the plunger 15 is attracted to the suction member 16, and thus separates from the pilot valve seat 8a of the main valve element 8, thereby putting the pilot port 7 in an open state. The high pressure refrigerant in the space 25 above the main valve element 8 then flows toward the low pressure side via the pilot port 7 in a larger amount than the high pressure refrigerant flowing into the upper space 25 from the space 26 below the main valve element 8 via the leak channel. Because of this, the refrigerant pressure in the space 25 above the main valve element 8 becomes lower than the refrigerant pressure in the guide groove 22 of the main valve element 8 and the refrigerant pressure in the space 26 below the main valve element 8. Due to the difference in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the main valve seat 10, so that the refrigerant pressures in all the four places are forced to become substantially uniform.

The permanent magnet $N_1$ is then repelled by the tongue 3A; the permanent magnet $S_1$ is attracted to the tongue 3B; the permanent magnet $N_2$ is repelled by the tongue 3B; and the permanent magnet $S_2$ is attracted to the tongue 3A. The valve main element 8 rotates in the X direction and shifts from the position shown in FIG. 5 to the position shown in FIG. 6.

As a result, the connecting groove 21 connects the outlet 11 communicating with the refrigerant inlet of the compressor 40 to the connecting hole 24 communicating with the outdoor heat exchanger 42, and the refrigerant circulates in the following order: the compressor 40→the four-way valve 1→the indoor heat exchanger 41→the throttle 43→the indoor heat exchanger 42→the four-way valve 1→the compressor 40. Thus, the operation mode of the refrigerating cycle is switched from the defrosting mode to the heating mode, and the refrigerating cycle resumes heating (step S22). The operation then moves back to step S11, and the same procedures are repeated.

If it is judges in step S18 that the compressor 40 should be stopped, i.e., that the amount of frost in the outdoor heat exchanger 42 is large (step S18: Yes), the compressor 40 is stopped (step S23).

The operation mode control signal $S_{drv}$ is then outputted to the air-conditioning switch power circuit 45 for 2 to 60 seconds, so that a reverse current is applied to the electromagnetic coil 4 of the four-way valve 1 for 2 to 60 seconds to magnetize the electromagnetic coil 4 in a manner that makes the casing 3 the south pole (step S24).

In the magnetic circuit M at this point, the plunger 15 is attracted to the suction member 16, and thus separates from the pilot valve seat 8a of the main valve element 8, thereby putting the pilot port 7 in an open state. The high pressure refrigerant in the space 25 above the main valve element 8 then flows toward the low pressure side via the pilot port 7 in a larger amount than the high pressure refrigerant flowing into the upper space 25 from the space 26 below the main valve element 8 via the leak channel. Because of this, the refrigerant pressure in the space 25 above the main valve element 8 becomes lower than the refrigerant pressure in the guide groove 22 of the main valve element 8 and the refrigerant pressure in the space 26 below the main valve element 8. Due to the different in pressure, the main valve element 8 ascends and separates from the main valve seat 10, as shown in FIG. 10.

As a result, the low pressure outlet 11 communicating with the refrigerant inlet of the compressor 40 and the high pressure inlet 12 communicating with the refrigerant outlet of the compressor 40, and the two connecting holes 23 and 24 are respectively connected by the space formed between the main valve element 8 and the vain valve seat 10, so that the refrigerant pressures in all the four places are forced to become substantially uniform.

The permanent magnet $N_1$ is then attracted to the tongue 3A; the permanent magnet $S_1$ is repelled by the tongue 3B; the permanent magnet $N_2$ is attracted to the tongue 3B; and the permanent magnet $S_2$ is repelled by the tongue 3A. The valve main element 8 rotates in the Y direction and shifts the position shown in FIG. 6 to the position shown in FIG. 5.

As a result, the connecting groove 21 connects the outlet 11 communicating with the refrigerant inlet of the compressor 40 to the connecting hole 23 communicating with the indoor heat exchanger 41, and the refrigerant circulates in the following order: the compressor 40→the four-way valve 1→the outdoor heat exchanger 42→the throttle 43→the indoor heat exchanger 41→the four-way valve 1→the compressor 40. Thus, the operation mode of the refrigerating cycle is switched from the heating mode to the defrosting mode.

After the switching to the defrosting mode, the compressor 40 is restarted (step S25), and the defrosting is started in the refrigerating cycle (step S20). The same procedures (steps S21 and S22) are then repeated.

The operation of the air conditioner using the refrigerating cycle of the first embodiment of the present invention has now ben fully described above.

It should be noted that the high pressure inlet 12, into which the high temperature and high pressure refrigerant discharged from the outlet of the compressor 40 is introduced, may be connected to the space 26 below the main valve element 8 from the side surface of the valve housing 2.

Referring now to the sectional view of FIG. 11, the structure of a four-way valve used in a refrigerating cycle of a second embodiment of the present invention will be described below. In this embodiment, the high pressure inlet, into which the high temperature and high pressure refrigerant is introduced, is connected to the space below the main valve element from the side surface of the valve housing, as mentioned above.

Figure 11:
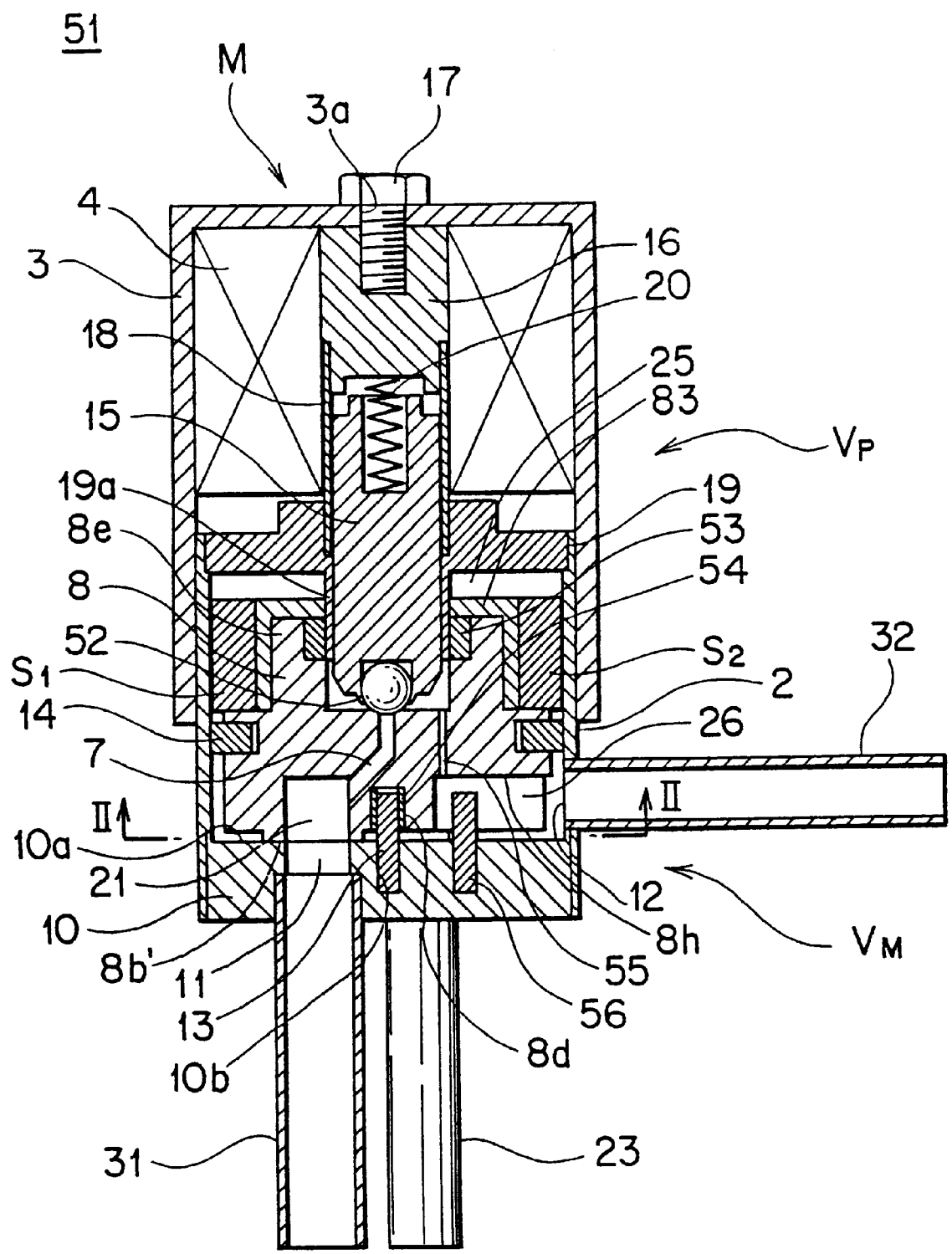
FIG. 11 is a sectional view of a four-way valve in the switch holding state in the refrigerating cycle of the second embodiment of the present invention.

It should be understood that like components are indicated by like reference numerals in FIG. 11 showing the four-way valve of the second embodiment and FIG. 1 showing the four-way valve in the refrigerant cycle of the first embodiment.

Structure of the Refrigerating Cycle of the Second Embodiment

The following is the description of the four-way valve used as a channel-switching valve in the refrigerating cycle of the second embodiment of the present invention, with reference to the sectional view of FIG. 11.

In this embodiment, the four-way valve 51 comprises the valve housing 2, the main valve $C_m$, the pilot valve $V_p$, and the magnetic circuit M. The shapes and relative positions of the valve housing 2, the non-magnetic spacer 19, and the main valve seat 10 are the same as in the first embodiment.

The main valve $V_m$ is made up of the lower portion of the main valve element 8, the main valve seat 10, and others, and the bottom surface 8b' of the main valve element 8 serves as the contact surface with the top surface 10a of the main valve seat 10.

The refrigerating cycle CC is the same as in the first embodiment, except that the four-way valve 1 of the first embodiment is replaced with the four-way valve 51.

Figure 12:
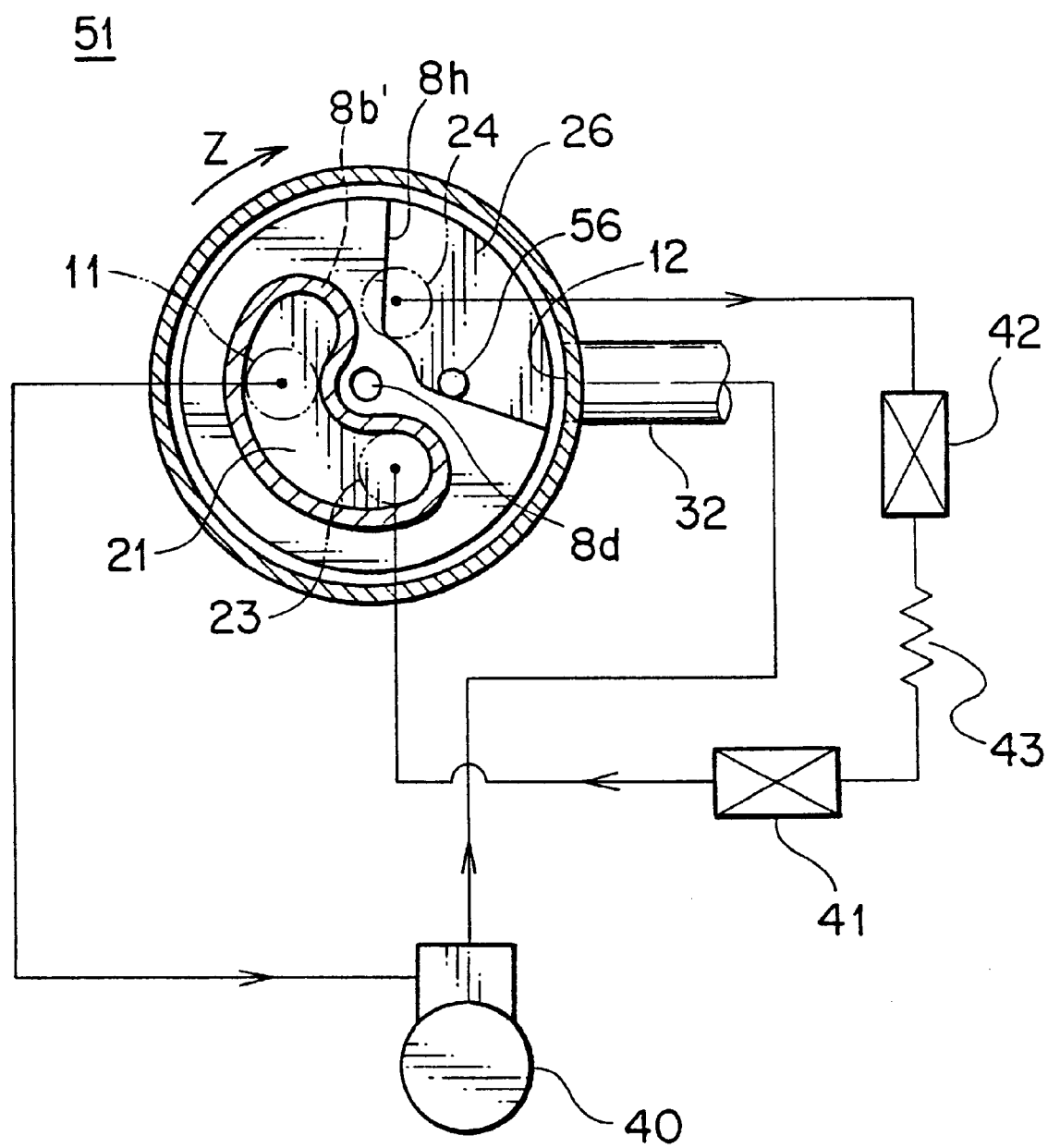
FIG. 12 is a schematic view of the refrigerating cycle in the cooling mode, including the four-way valve (a bottom view of the main valve element is shown) of FIG. 11.

Referring now to FIG. 12, the structure of the main valve element 8 of the four-way valve 51 will be described below.

On the bottom surface 8b' of the main valve element 8, the connecting groove 21 for connecting the outlet 11 communicating with the refrigerant inlet of the compressor 40 in the cooling mode to the connecting hole 23 communicating with the indoor heat exchanger 41. The outlet 11 is formed in the main valve seat 10.

A guide groove 8h is formed by cutting out a part of the bottom surface 8b'. With the bottom surface 8b' of the main valve element 8 being in contact with the main valve seat 10, the space 26 is formed below the guide groove 8h, i.e., between the guide groove 8h and the main valve seat 10.

The space 26 below the guide groove 8h communicates with the inlet 12 introduced from the side surface of the valve housing 2, and also communicates with the connecting hole 24 formed through the main valve seat 10. The inlet 12 communicates the port 32 communicating with the refrigerant outlet of the compressor 40, and the connecting hole 24 communicates with the outdoor heat exchanger 42.

As shown in FIG. 11, the inner surface of the cylindrical protruding portion 19a formed by the non-magnetic spacer 19 above the main valve element 8 functions as a guide for the plunger 15, while the outer surface functions as a slide guide for a bearing 53 formed on the inner surface side of the upper portion 8e of the main valve element 8.

An equalizer hole 55 is formed in the main valve element 8. The equalizer hole 55 quickly equalizes the refrigerant pressures in the space 25 above the main valve element 8 and in the space 26 below the main valve element 8 so as to allow the main valve element 8 to descend smoothly. Otherwise, the piston ring 14 might prevent the main valve element 8 from descending smoothly.

The space above the main valve element 8, i.e., the space 25 between the non-magnetic spacer 19 and the main valve element 8 and the space 26 below the guide groove 8h are connected by the equalizer hole 55.

The shaft 13 is fixed to the center of the top surface of the main valve seat 10, an a shaft hole 8d is formed in the center of the bottom surface 8b' of the main valve element 8. The shaft hole 8d is provided with a bearing 54 to hold the shaft 13. The main valve element 8 is rotatably attached to the main valve seat 10 by the shaft 13.

A permeable yoke 83 is formed in the upper portion of the main valve element 8, and the yoke 83 is provided with permanent magnets $S_1$, $S_2$, $N_1$, and $N_2$. When the electromagnetic coil 4 is energized, the main valve element 8 rotates so as to switch the ports 11, 12, 23, and 24.

The piston ring 14 is provided with a slit (not shown) by cutting out a part of it in the circumferential direction of the main valve element 8, and the outer diameters of the permanent magnets $S_1$, $S_2$, $N_1$, and $N_2$ are made smaller than the inner diameter of the valve housing 2. A leak channel is formed by the gap between the valve housing 2 and the permanent magnets $S_1$, $S_2$, $N_1$, and $N_2$, the slit of the piston ring 14, and the gap between the circumferential surface of the valve main element 8 and the inner wall of the valve housing 2.

The space 26 below the guide groove 8h thus communicates with the space 25 above the main valve element 8 via the leak channel.

The disk-type main valve seat 10, from which the bottom surface 8b' separates to open the valve, is situated below the main valve element 8. The outlet 11 and the inlet 12, and the two connecting holes 23 and 24 are formed through the valve main seat 10. A rotation stopper 56 is inserted into and fixed to the main valve seat 10, and functions as a stopper for the rotatable main valve element 8.

With the structure of the main valve $V_m$, the operation mode can be switched between the cooling mode and the heating mode. In the cooling mode, the outlet 11 communicates with the connecting hole 23, while the inlet 12 communicates with the connecting hole 24, as shown in FIG. 12. In the heating mode, the main valve element 8 rotates in the Z direction shown in FIG. 12, and the outlet 11 communicates with the connecting hole 24, while the inlet 12 communicates with the connecting hole 23.

The pilot port 7 is formed in the center of the upper portion of the main valve element 8, and it communicates with the connecting groove 21, as shown in FIG. 11. Also, a sphere valve 52 as a pilot valve element is disposed below the plunger 15.

As the operation of the air conditioner using the refrigerating cycle including the four-way valve 51 is the same as in the first embodiment, a detailed description of it will not be given below. By switching the electromagnetic coil 4 between an energized state and a non-energized state, and by switching the energizing direction, the main valve element 8 separates from the main valve seat 10, and rotates to switch the channels. Thus, the operation mode can be switched between the cooling mode and the heating mode.

The air-conditioner using the refrigerating cycle of the second embodiment of the present invention has now been fully described.

In the first and second embodiments described above, an electromagnetic drive is sued to move the pilot valve element 15a (or 52) up and down as the main valve element 8 rotates. However, it is possible to employ other drive means such as an electric drive, as long as it has the same function.

Although the plunger spring 20 as a compression coil spring is used to energize the pilot valve element 15a (or 52) toward the pilot port 7, it is possible to employ other energizing means.

Since the main valve element 8 ascends and separates from the main valve seat 10 by the piloting, the piston ring 14 situated between the side surface of the main valve element 8 an the inner surface of the valve housing 2 serves as sealing means so as to prevent the refrigerant from leaking more than necessary into the space 25 above the main valve element 8 through the guide groove 22 while to secure the communication between the space 25 above the main valve element 8 and the guide groove 22 via the leak channel formed by the slit (not shown) of the piston ring 14.

A narrow gap between the side surface of the main valve element 8 and the inner surface of the valve housing 2 can make the sealing means unnecessary. Also, other sealing means structurally different from the piston ring 14 may be employed.

Although the shaft 13 is disposed between the concave portion 8d formed in the rotation center of the main valve element 8 and the concave portion 10b opposite to the concave portion 8d, it may be integrally formed with the main valve element 8 or the main valve seat 10.

Field of Industry in which the Invention is to be Utilized

As is apparent from the first and second embodiments described above, in the channel-switching valve of the present invention, the pilot valve is opened by the pilot valve element drive. Because of this, a pressure difference is caused between the spaces above and below the main valve element. Due to the difference in pressure, the main valve element is separated from the main valve seat and rotated by the main valve element drive, which allows switching between the channels. Thus, the structure of the channel-switching valve can be made simple and compact.

Since the main valve element is separate from the main valve seat during the switching operation, abrasion on the sealing portion is minimized. Even if a foreign matter is stuck between the main valve element and the main valve seat, it can be removed by the refrigerant flow so that the maintenance will be easy. Since the main valve element is pressed onto the main valve seat by a high pressure fluid when the valve is closed, it is not necessary to activate the drive unit. Thus, a channel-switching valve which makes no noise when the operation is stopped in the refrigerating cycle.

The channel-switching valve of the present invention further comprises an energizing unit for energizing the pilot valve element toward the pilot port, so that the pilot valve can be closed quickly, and the seal between the pilot valve element and the pilot valve seat in the closed state can be strengthened. Thus, the channel-switching valve having excellent operation characteristics can be provided.

In the channel-switching valve of the present invention, the sealing unit for restricting the flow rate of a fluid passing through the equalizer channel formed inside the valve housing for externally connecting an end surface of the main valve element to the other end surface of the main valve element is formed by the piston ring that is attached on the outer periphery of the main valve element and slides along the inner periphery of the valve housing. Because of this, there is no need to adjust the gap between the side surface of the main valve element and the inner surface of the valve housing. Thus, the channel-switching valve that is assembled more easily than in the prior art can be provided.

In the channel-switching valve of the present invention, the single drive unit made up of the main valve element drive unit and the pilot valve element drive unit is provided with the electromagnetic coil, so that the pilot valve can be opened to cause a difference in pressure between the spaces above and below the main valve element by switching the energizing direction of the electromagnetic coil. Due to the difference in pressure, the main valve element is separated form the main valve seat and rotated to switch the channels. Thus, the channel-switching valve can be switched without energizing the electromagnetic coil continuously, and the energy consumption can be dramatically reduced.

Also in the channel-switching valve of the present invention, the shaft inserted into both the main valve element and the main valve seat restricts the center of rotation of the main valve element in the circumferential direction of the valve housing. Thus, the manufacture of the main valve element and the main valve seat can be made simpler, and the channel-switching valve that is easy to maintain can be provided.

In the refrigerating cycle of the present invention, the channels can be switched by the channel-switching valve with the compressor in operation. Thus, the energy consumption can be reduced, and the operation efficiency of the refrigerating cycle can be improved with the shortened defrosting time.

Also in the refrigerating cycle of the present invention, the load can be reduced by energizing the channel-switching valve prior to restarting the compressor, so that the energy consumption can be reduced.

Further in the refrigerating cycle of the present invention, it is not necessary to actuate the drive unit for rotating the main valve element when the main valve element is in a closed state, and the drive unit is actuated only when switching the channels. Thus, the energy consumption can be reduced, and the refrigerating cycle that makes no noise when the operation is stopped can be provided.

The channel-switching valve control method of the present invention includes the step of connecting the high pressure fluid channel and the low pressure fluid channel inside the valve housing in accordance with an external instruction. By this method, the pressure difference between the high pressure fluid and the low pressure fluid applied to the channel-switching valve has no adverse influence on the channel switching. Thus, the channels can be easily switched, and the energy consumption can be reduced.

The channel-switching valve control method of the present invention also includes the step of switching the channels of a high pressure fluid and a low pressure fluid by driving the channel-switching valve when the high pressure fluid channel and the low pressure fluid channel are connected inside the valve housing in accordance with a channel-switching instruction which is an external instruction. By this method, the channel switching can be performed without subjecting the channel-switching valve to a pressure corresponding to the pressure difference between the high pressure fluid and the low pressure fluid. Thus, the power consumption in driving the channel-switching valve can be reduced.

More specifically, since there is no need to stop the compressor when switching the operation mode between a cooling mode and a heating mode according to the present invention, the period of time required for defrosting can be shortened, and the refrigerating cycle of excellent operation efficiency can be provided.

The channel-switching valve control method of the present invention also includes the step of holding the channel-switching valve in a switch holding position by virtue of the pressure difference between the high pressure fluid and the low pressure fluid when the high pressure fluid channel and the low pressure fluid channel are not connected inside the valve housing. By this method, no electric power is required for holding the channel-switching valve, so that the power consumption can be reduced. Thus, no noise is made when the refrigerating cycle is stopped.

More specifically, when the channel-switching valve is in the switch holding position, there is no need to actuate a holding unit. It is necessary to actuate a driving unit only when switching the channels. Thus, the energy consumption can be reduced, and the refrigerating cycle makes no noise when stopping the operation.

The refrigerating cycle control method of the present invention includes the step of connecting the high pressure fluid channel and the low pressure fluid channel inside the channel-switching valve by controlling the channel-switching valve in accordance with an external instruction, so that the pressure difference between the high pressure fluid and the low pressure fluid has no adverse influence on the channel-switching valve. Thus, the channel switching can be easily performed, and the power consumption can be reduced.

More specifically, the load can be reduced by energizing the channel-switching valve prior to restarting the compressor, so that the energy consumption of the refrigerating cycle can be reduced.

The refrigerating cycle control method of the present invention also includes the step of switching the channels of the high pressure fluid and the low pressure fluid when the high pressure fluid channel and the low pressure fluid channel are connected inside the channel-switching valve in accordance with a channel-switching instruction which is an external instruction. By this method, the channel switching can be performed without subjecting the channel-switching valve to the pressure difference between the high pressure fluid and the low pressure fluid. Thus, the power consumption in switching the channels can be reduced.

More specifically, since there is no need to stop the compressor when switching the operation mode between cooling and heating, the period of time required for defrosting can be shortened, and the refrigerating cycle of excellent operation efficiency can be provided.

The refrigerating cycle control method of the present invention further includes the step of holding the channel-switching vale in a switched state by virtue of the pressure fluid when the high pressure fluid channel and the low pressure fluid channel are unconnected inside the channel-switching valve. By this method, no electric power is consumed in holding the channels after the channel switching by the channel-switching valve. Thus the power consumption can be reduced, and the refrigerating cycle makes no noise when stopped.

More specifically, when the channel-switching valve is held in a switched state, there is no need to actuate the channel-switching valve. It is necessary consumption can be reduced, and the refrigerating cycle makes no noise when stopping the operation.

What is claimed is:

1. A method of controlling a channel-switching valve which switches fluid channels of a high pressure fluid and a low pressure fluid introduced into a hollow vale housing from the outside thereof by moving a main valve element between a first position to a second position inside said valve housing, characterized by comprising the steps of:

detaching a pilot valve element from a pilot valve seat provided on said main valve element in an axial direction of said main valve element for introducing said low pressure fluid into a pilot valve element side in accordance with an external instruction;

moving said main valve element to a third position, said third position being different from both said first position and second position; and connecting said high pressure fluid channel to said low pressure fluid channel inside said valve housing.

2. The method according to claim 1, further comprising the step of switching said high pressure fluid channel and said low pressure fluid channel, with both said fluid channels being connected inside said valve housing in accordance with a channel-switching instruction which is said external instruction.

3. The method according to claim 1, further comprising the step of holding said main valve element either in said first position or in said second position by virtue of a difference in pressure between said high pressure fluid and said low pressure fluid, with said high pressure fluid channel and said low pressure fluid channel being unconnected inside said valve housing.

* * * * *